United States Patent [19]
House

[11] 4,059,168
[45] Nov. 22, 1977

[54] RUNNER ATTACHMENT FOR BICYCLES WITH A REACTION THRUST DEVICE

[76] Inventor: Herbert Douglas House, 3111 Edgewood Drive, Wonder Lake, Ill. 60097

[21] Appl. No.: 655,281

[22] Filed: Feb. 4, 1976

[51] Int. Cl.² .............................................. B62D 57/04
[52] U.S. Cl. ........................................ 180/1 P; 180/7 P; 280/7.14; 280/16; 280/28
[58] Field of Search .............. 180/1 R, 1 P, 1 FV, 180/3 R, 7 P, 6 A; 280/16, 28, 27, 12.1, 12.11, 12.13, 12.14, 7.12, 7.14, 21 A

[56] References Cited
U.S. PATENT DOCUMENTS

| | | | |
|---|---|---|---|
| 566,438 | 8/1896 | Anderson et al. | 280/7.14 |
| 1,146,210 | 7/1915 | Steen | 180/3 R |
| 1,654,284 | 12/1927 | Fageol | 280/16 |
| 2,316,272 | 4/1943 | Meyer | 280/16 |
| 2,346,351 | 4/1944 | Bombardier | 280/16 |
| 2,492,965 | 1/1950 | Carr | 280/7.14 |
| 3,203,706 | 8/1965 | Boyden | 280/7.12 |
| 3,841,649 | 10/1974 | McMullen | 180/7 P |

*Primary Examiner*—Joseph F. Peters, Jr.
*Assistant Examiner*—David M. Mitchell

[57] ABSTRACT

A bicycle frame equipped with two, in line, runner attachments and a thrust producing device for use on snow or ice.

1 Claim, 3 Drawing Figures

RUNNER ATTACHMENT FOR BICYCLES WITH A REACTION THRUST DEVICE

SUMMARY OF THE INVENTION

Adherence to a precise geometric relationship of members in the design of a runner attachment will result in very good resistance to tipping about the pivot and cause the elevation of the front upon lifting the assembly from the surface; it will absorb the impact imparted by a bumpy surface. These attributes allow simple mounting by means of the axle bearing assemblies like the wheels they replace. An engine and propeller or other reaction thrust device with ancillary equipment can be mounted on the runner attachment; making seperate, permanent attachment to the bicycle frame unnecessary. It was designed for low cost, enjoyable transportation on ice or snow.

Figure 1:
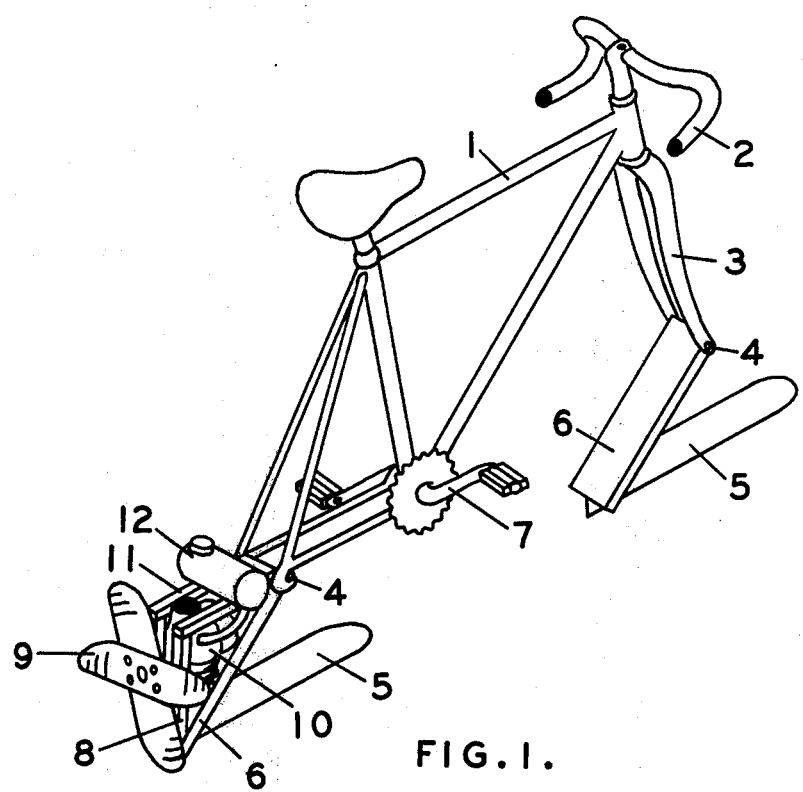
FIG. 1 depicts a bicycle frame with the package attached.
Figures 2, 3:
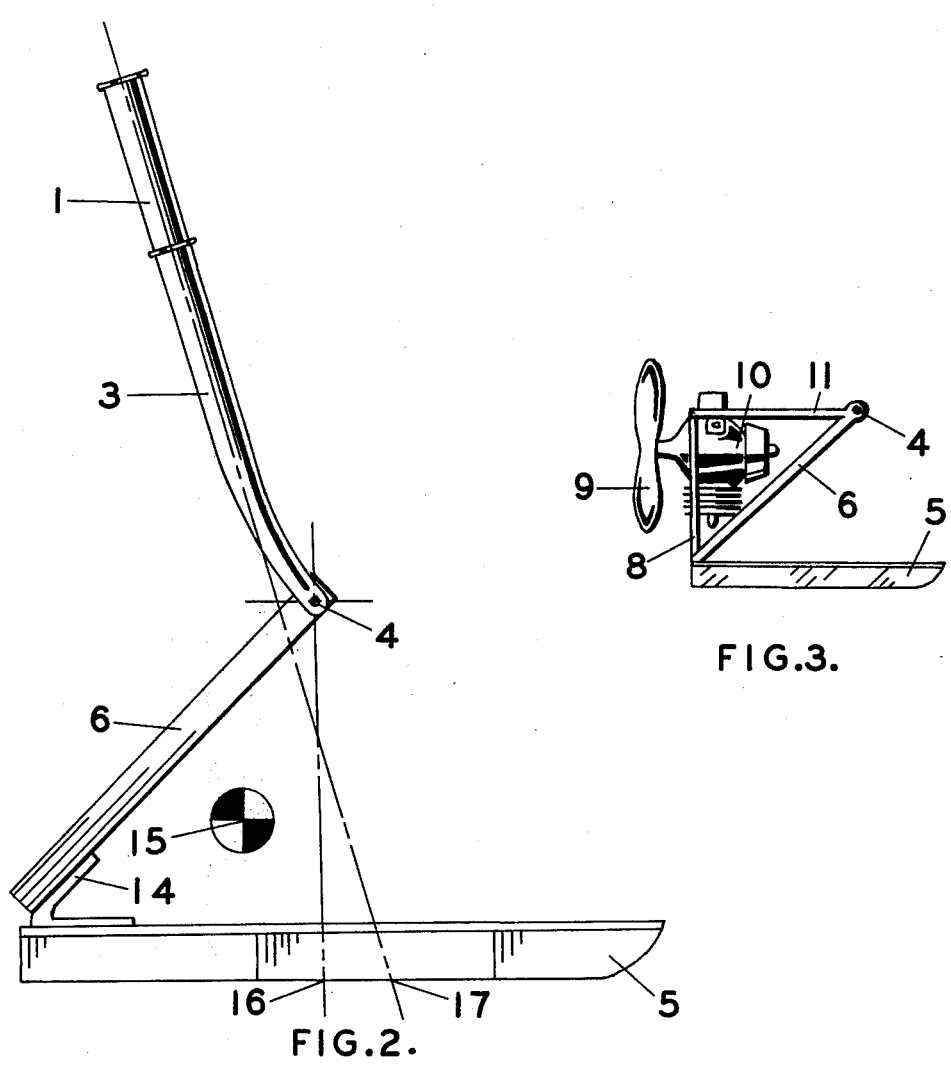
FIG. 2 shows the geometrical relationships of the suspension and skates (including the front fork assembly).
FIG. 3 shows the rear assembly which includes the skate, suspension and thrust package.

The device described in this application is unique in operation and design despite the use of common parts. It is easy to ride, if you ride a bicycle, and is most of all fun. It requires concentration to control sideslip but because of the freedom to lean on turns, maneuverability is good at moderate speeds. The pakage was mounted on a bicycle frame 1 with the front fork 3 handle bars 2, seat 13 and the crank assembly 7. The skates 5 were fabricated by riveting two 18 inch lengths of ¼ inch × 2 inch × 2 inch angle iron together to form a "T" section. One half of the upright of the "T" was shortened to 1.5 inches and the remaining edge was squared on a surface grinder. The forward ends were rounded to provide a proper lead. Two 4 inch lengths of ¼ inch × 3 inch × 3 inch angle iron were heated and bent from 90° to 45°, these brackets 14 were bolted firmly to the skates and to the cantilever suspension links 6. The links 6 were made of 1 inch × 4 inch, clear ash and were fitted with bicycle axle and bearing assemblies 4. The axles 4 provide firm attachment to the frame 1 while allowing one degree of motion, pitch, relative to the frame 1 and the front fork 3. Hand fashioned oak supports 8,11 were attached to the rear suspension link 6 and a 2.5 H.P. 2-cycle lawn mower engine 10 mounted. A fuel tank 12 was mounted on the top engine support 11 for gravity feed to the engine 10. An automobile radiator fan blade 9 was selected to fit the engine and provide thrust rearward during normal engine rotation. The trailing link cantilever suspension is proportioned to locate the axle 4 directly above the center of lift 16 of the working edge of the skate 5. The center of gravity 15 will be well behind the center of lift 16. When the suspension assembly 5,6,4 is lifted, the center of gravity 15 will rotate to a position under the axle 4 and incline the skate with the front well above the rear. When the suspension assembly is mounted on the castered front fork 3, the pivot center 17 is well forward of the lift center 16. Because the length of skate 5 behind the pivot center 17 is greater than the length in front, the drag will tend to return the steering to straight travel and requires force only to turn, yaw. The ability of the cantilever trailing link 6 to pitch around the axle 4 substantially dampens the impact of bumps encountered by the skate 5 and allow compensation for changes in contour.

The first commercial application intended is to develop a conversion package for bicycles. The package would consist of both front and rear trailing link cantilever suspension equipped skates or skis, the rear to have a self-contained thrust package. A runner attachment package is inexpensive because most of the components are mass produced for other applications.

I claim:

1. In a runner attachment for bicycles having front and rear axles; a runner having a "T" shape in lateral cross section comprised of longitudinally extending angle members, a link attached to the runner to incline from the rear of the runner to a point located directly above midspan of the runner at which point are mounted bearings for attachment to the front and rear bicycle axles, a self-contained reaction thrust device, support member means attached to the inclined link for supporting the reaction thrust device so as to act toward the rear.

* * * * *